United States Patent [19]
Bodin et al.

[11] Patent Number: 5,866,231
[45] Date of Patent: Feb. 2, 1999

[54] SOUND AND THERMIC INSULATION MATTRESS HAVING A FOAM INSERT FOR SECURING TO A SUPPORT AND A METHOD FOR PREPARING SUCH MATTRESS

[75] Inventors: Philippe Bodin, Tournefeville; Michel Eugene, Colomiers; Luc Michelet, Cornebarrieu, all of France

[73] Assignee: Aerospatiale Societe Nationale Industrielle, Paris, France

[21] Appl. No.: 994,770

[22] Filed: Dec. 22, 1992

[30] Foreign Application Priority Data

Dec. 26, 1991 [FR] France .................................. 91 16168

[51] Int. Cl.⁶ .............................. F16L 5/02; B64C 1/12; B32B 3/24
[52] U.S. Cl. .......................... 428/131; 428/137; 428/138; 428/74; 428/196; 428/304.4; 428/426; 428/346; 16/2.2; 244/131
[58] Field of Search ..................... 428/131, 137, 428/138, 74, 196, 304.4, 426, 346; 16/2.2; 244/131

[56] References Cited

U.S. PATENT DOCUMENTS

| | | | |
|---|---|---|---|
| 2,129,167 | 9/1938 | Cunnington | 16/2 |
| 2,376,698 | 5/1945 | Irvine | 52/744 |
| 3,182,119 | 5/1965 | Millard | 16/2 |
| 3,895,409 | 7/1975 | Kwatonowski | 16/2 |
| 4,568,597 | 2/1986 | Williams | 428/137 |
| 4,653,246 | 3/1987 | Hepler | 16/2 |
| 4,901,395 | 2/1990 | Semrau | 16/2 |

FOREIGN PATENT DOCUMENTS 1362078  4/1964  France .

*Primary Examiner*—William P. Watkins, III
*Attorney, Agent, or Firm*—Michael N. Meller

[57] ABSTRACT

Portions of a sound and thermic insulation mattress are modified so as to retain the water imperviousness of the mattress and its insulation characteristics when it is secured to a support. The mattress is provided with an opening therein and a foam insert arranged in the opening and provided with an orifice. The insert is held in the opening by an adhesive strip which is glued to the foam insert and the mattress.

4 Claims, 3 Drawing Sheets

SOUND AND THERMIC INSULATION MATTRESS HAVING A FOAM INSERT FOR SECURING TO A SUPPORT AND A METHOD FOR PREPARING SUCH MATTRESS

FIELD OF THE INVENTION

The invention concerns a method for preparing a sound and thermic insulation mattress and said mattress prepared by said method. The method of the invention makes it possible to prepare a sound and thermic insulation mattress used in aeronautics and needing to be subsequently secured to a steel plate forming the fuselage of the aircraft or one portion of the fuselage structure.

BACKGROUND OF THE INVENTION

Civil transport airplanes are soundproofed and thermically insulated so as to offer maximum comfort to the passengers and aircrew. Insulation mattresses are generally formed of glass wool or another equivalent material and covered with a protective fabric. They are intended to be secured to the metallic structural portions of the aircraft readily resulting in producing heat and vibrations. Their role is to ensure suitable sound and thermic insulation of the plane in relation to the external environment. In other words, they make it possible to protect the passengers and crew from cold temperatures when the plane is flying at high altitudes and noises emanating from the aircraft engine or aerodynamic noises.

The performances of these mattresses are directly linked to their design conception and it is particularly important that they be sealed and that the glass wool constituting them has a homogeneous thickness.

This sound and thermic insulation is nevertheless rarely uniform owing to the various items of equipment traversing this mattress, items such as electric cables or ventilation sheathes and their supports and especially the numerous points for securing this insulation mattress to the fuselage. These fixing points are formed of a large number of gaps affording protection against cold and noise. In fact, the glass wool at the level of these fixing points may allow humidity and condensation water to pass absorbed by said wool.

These sound and thermic insulation mattresses are currently secured to the structure forming a support by means of slugs and fixing washers. The accompanying FIG. 1 shows the methods for preparing and fixing said insulation mattress according to the prior art.

As shown on FIG. 1, the fuselage of the aircraft 1 is covered by a large number of juxtaposed mattresses hereafter denoted as sound and thermic insulation mattresses 3 which are secured to its surface. This mattress is generally made of glass wool. In addition, the fuselage 1 includes at regular intervals sections 5 projecting from its internal surface approximately perpendicular to the latter and denoted hereafter as frames. A single frame is shown on FIG. 1. Each frame 5 is pierced with one orifice 7. The frame 5 is covered on its two faces with an insulation mattress element 3 folded in two. Before being disposed on the frame 5, this mattress has been prepared and pierced so as to facilitate its installation.

This preparation may be effected in two ways shown on both sides of the frame.

As shown in the lower portion of FIG. 1, the insulation mattress 3 is pierced with an orifice 9 having a small diameter and roughly corresponding to the diameter of the fixing slug 11 used for fixing this mattress (for example, 6 mm). The fixing slug 11 is then placed in the orifices 7 and 9 and the mattress is held against the frame 5 by means of two washers 13 forcefully driven onto the slug 11 on both sides of the frame 5 and maintained on the latter by means of the striae 14 of the slug 11.

This type of piercing of the mattress with a small diameter makes it possible to have little or no sound and thermic leaks, but imperviousness of the mattress is not ensured. In fact, the glass wool absorbs condensation water via these orifices 9. Moreover, the insulation mattress 3 is embrittled in these zones and there may be tears at this location.

The upper portion of FIG. 1 shows a second mode for piercing of the mattress, said mode consisting of piercing an opening 15 with a much larger diameter (for example, about between 38 and 50 mm) and then of laying at the level of this opening 15 two flexible thermoglueing adhesive layers 17 enabling this opening to be bordered. This adhesive may also be reinforced by an excess pitting (not shown on FIG. 1).

The mode for fixing by the slug 11 and the washers 13 is then identical to the one described above. In this case, imperviousness is ensured by the adhesive 17, but the sound and thermic losses caused by the removal of the glass wool are considerable.

SUMMARY OF THE INVENTION

Accordingly, the object of the invention is to resolve these drawbacks of the prior art.

To this effect, the invention concerns a method for preparing a sound and thermic insulation mattress.

According to the characteristics of the invention, this method includes the following stages:

piercing an insulating mattress so as to form there at least one opening, introducing into this opening a foam insert with dimensions corresponding to those of said opening, this foam insert being waterproof and having sound and thermic insulation properties, glueing onto at least one of the two faces of this insert at least one adhesive strip whose surface is larger than that of the insert so that it also covers at least one portion of the insulating mattress and ensures the sealed link between the insert and the mattress.

These characteristics of the invention make it possible to facilitate the subsequent mounting of the mattress, increase the mechanical resistance of the latter and avoid any problems of tearing which occured in the prior art. In addition, this method is able to improve imperviousness where the mattress is pierced and considerably limit any sound and thermic losses since the removed glass wool is replaced by the foam insert. Thus, efficient continuity of insulation is obtained.

According to one first embodiment of the invention, the method includes the subsequent stages consisting of simultaneously piercing a hole in the adhesive strip and an orifice in the foam insert, this orifice opening onto the two opposing faces of the insert, this hole and this orifice being aligned.

This method thus makes it possible to initially prepare the mattress and then to solely pierce the required orifices as and when needed when the mattress is placed in front of the support it needs to cover.

According to a second embodiment of the invention, the method consists of piercing an orifice in the foam insert before introducing it into the opening, this orifice opening onto the two opposing faces of said insert, and subsequently piercing a hole in the adhesive strip before glueing it to the foam insert.

In this case, the piercing plane of the orifices is preestablished and the orifices are pierced at the time the mattress is prepared. The two modes of preparation may also be combined.

The invention also concerns a sound and thermic insulation mattress including an insulating mattress provided with at least one opening housing a foam insert with corresponding dimensions, this insert being impervious to water and having sound and thermic insulation properties and kept in place by at least one adhesive strip glued onto at least one of the two opposing faces of this insert, said adhesive strip having a surface larger than that of the insert so as to also cover at least one portion of the insulating mattress and ensure a sealed link between this insert and this insulating mattress.

Once it has been prepared as above, this mattress may then be pierced at the level of the inserts and secured to a support.

BRIEF DESCRIPTION OF THE DRAWINGS

The invention shall more readily be understood from a reading of the following description of one embodiment, given by way of non-restrictive example, with reference to the accompanying drawings on which.

DETAILED DESCRIPTION OF THE PREFERRED EMBODIMENTS

Figure 2:
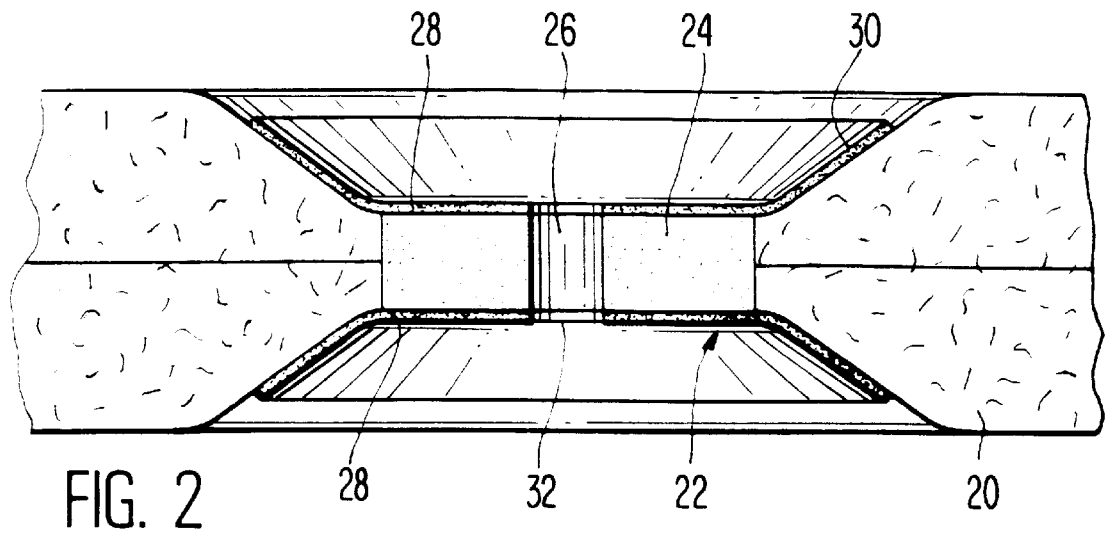
FIG. 2 is a cutaway view of the mattress prepared according to the invention.

FIG. 2 shows the stages of the method of the invention.

The sound and thermic insulation mattress 20, preferably made of glass wool, is pierced so as to form there an opening 22, preferably circular. As shown again on FIG. 2, this mattress is embodied in the form of two superimposed layers. However, it could also have any other number of layers.

A foam insert 24 is introduced into the opening 22. This insert is preferably made of water-repellent foam having a density in excess of 30 kg/m3. This insert prevents the absorption of water and embodies sound and thermic insulation in this zone by replacing the glass wool which has been removed. In addition, this insert increases the resistance of the mattress and avoids any risks of tearing as the mechanical resistance of the foam is clearly greater than that of the glass wool. This insert 24 has the same shape and dimensions as those of the opening 22. According to one first embodiment, this foam insert 24 internally has one discharging orifice 26.

Then, onto at least one of the two opposing faces 28 of this insert, an adhesive strip 30 is glued (possibly several) whose dimensions are such that it covers the entire foam insert 24 and at least one portion of the mattress 20 forming the edge of the opening 22. This adhesive strip is preferably glued onto the two faces 28 of the insert 24 so as to correctly support the latter and more particularly ensure imperviousness. This adhesive strip 30 is advantageously glued by means of heat welding.

Each adhesive strip 30 has one hole 32 provided opposite the discharging orifice 26 of the foam insert 24. These holes are preferably pierced before glueing the adhesive strips so as to facilitate preparation of the mattress. However, in one second embodiment of the invention, it is also possible to pierce the orifices 26 and holes 32 after having adapted the foam insert 24 and the adhesive strip(s) 30. This makes it possible to adapt the mattress to the various supports to which it is secured and avoid undesirably piercing the orifices.

Purely by way of illustrative example, for a glass wool mattress 20 with a thickness of 5 cm, the foam insert 24 has a diameter of about 38 mm, a thickness of close to 10 mm and the diameter of the discharging orifice 26 is close to 7 mm.

Then the prepared mattress is now ready to be secured to its support.

Figure 3:
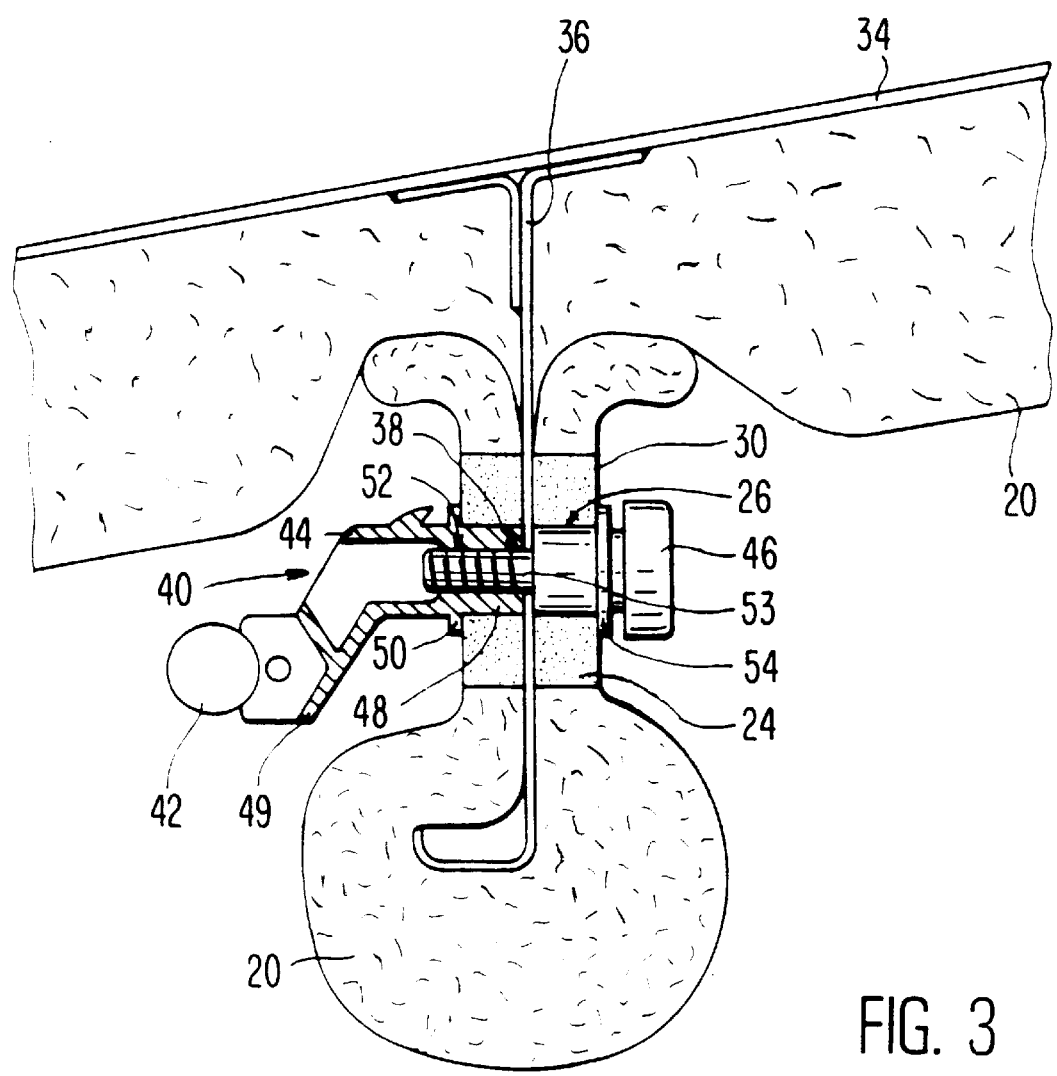
FIG. 3 is a cutaway view showing an insulation mattress secured to a support.

FIG. 3 shows an example for securing the sound and thermic insulation mattress 20 to one portion of the fuselage of an aircraft. The fuselage of the plane is constituted by a relatively smooth steel plate 34 secured to one first element of a sound and thermic insulation mattress 20. A large number of sections 36 known as frames (only one being shown on FIG. 3) are fixed roughly at a right angle with respect to the fuselage 34 and parallel to one another. This frame 36 has one orifice 38 and is covered on its two faces by a second sound and thermic insulation mattress element 20 folded in two and prepared in accordance with the invention with two foam inserts 24 kept together via the glueing of adhesive strips 30.

Figure 1:
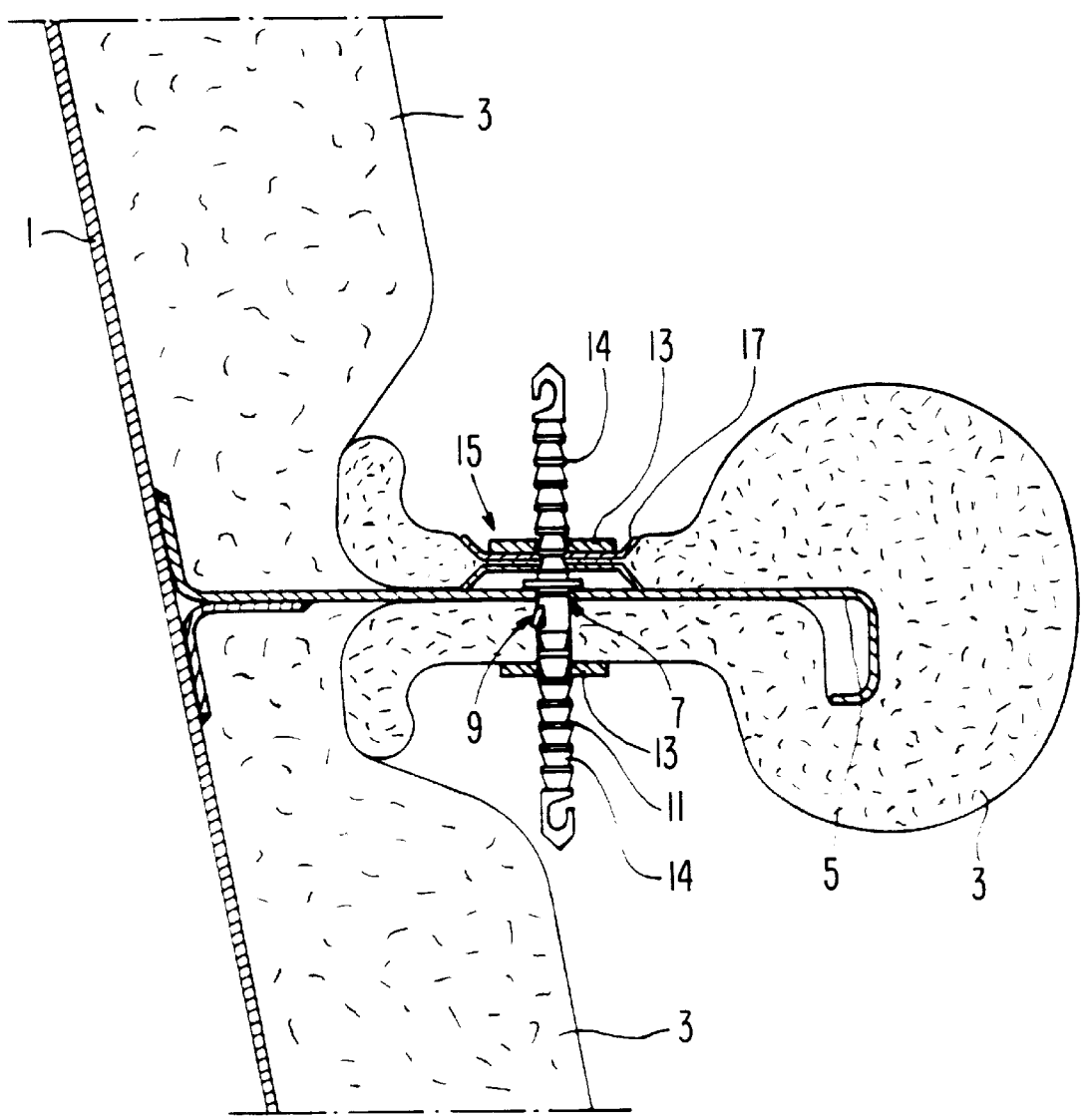
FIG. 1 is a cutaway view showing two modes for preparing and fixing a mattress according to the prior art.

This mattress 20 may be kept in place by a slug 11 and a washer 13 similar to the way described for the prior art on FIG. 1. This mattress 20 may also be fixed by a support slug 40 able to simultaneously support an electric cable 42.

This slug 40 is formed of two halves, one first half 44 supporting the electric cable 42 and intended to be assembled with one second half 46. The first half 44 of the slug 40 includes a portion 48 roughly corresponding to the diameter of the discharging orifice 26 of the foam insert 24 and intended to be fixed in the latter and a support at Y 49 for receiving the cable 42. This first half 44 further includes an annular projection 50 forming a known type of shoulder for abutting against the foam insert 24 and the external surface of the adhesive strip 30. The cylindrical portion 48 internally has a tapped orifice 52 intended to receive the threaded extremity 53 of the second half 46 of the slug 40.

The second portion 46 of the slug 40 also has an annular projection 54 similar to the projection 50 and intended to abut against the foam insert 24 and which replaces the washer 13. The two folded back portions of the thermic and sound insulation mattress 20 are clamped between the two halves of the slug 40 and fixed in this way.

Figure 4:
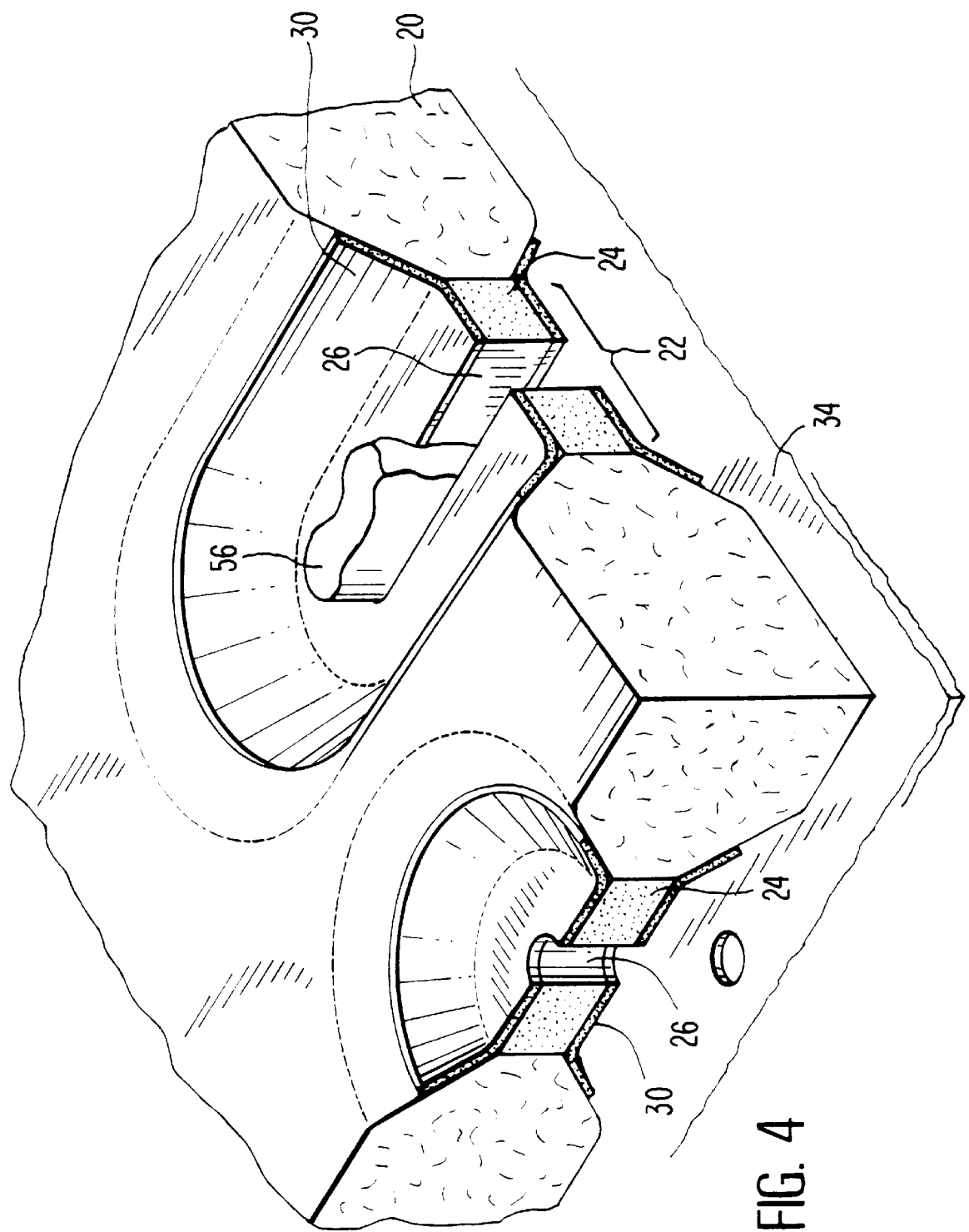
FIG. 4 is a perspective view of a mattress prepared according to the invention before said mattress is secured to the support.

One second embodiment of the invention is shown on FIG. 4. Not only the sound and thermic insulation mattress 20 is able to be kept in place by slugs passing through small approximately circular orifices 26 such as those shown in the left portion of FIG. 4, but it is also possible to provide openings inside this mattress allowing for passage to sections 56 or supports (partially shown) projecting from the surface of the fuselage 34. In this case, the foam insert 24 and the opening 22 of the mattress 20 may, for example, have an oblong shape and the discharging orifice 26 provided in the insert 24 has the shape of a slit whose dimensions solely allow for the passage of this section 56 made of a thin steel plate. Here again, the foam insert 24 ensures insulation and improves the mechanical characteristics of the mattress.

Measurements have shown that the use of these foam inserts 24 considerably reduced transmission of noise inside the aircraft, especially within the range of frequencies exceeding 1000 Hz.

This method has been described as being applicable more particularly for securing a sound and thermic insulation mattress to a fuselage type of support of an aircraft. However, it is also possible to envisage using this method for fixing a mattress intended to insulate other walls or mechanical parts.

What is claimed is:

1. Sound and thermic insulation mattress to be secured to a support and comprising an insulating mattress having at least one opening; a compressible water repellent foam insert having two opposing faces and being mounted in said opening of said mattress, said insert being large enough to substantially fill said opening, being watertight and having sound and thermic insulation properties; and at least one adhesive strip glued onto at least one of the two opposing faces of said insert, said adhesive strip having a surface larger than that of the insert so as to keep said insert in place and to also cover no more than at least a portion of the insulating mattress directly surrounding said opening to ensure a sealed link between said insert and said insulating mattress when said mattress is secured to said support.

2. Sound and thermic insulation mattress according to claim 1, wherein said foam insert is pierced with an opening concentric with said mattress opening which extends to each of the opposing faces of said insert and said adhesive strip is pierced with a hole, with said opening in said insert cooperating with said hole in said adhesive strip.

3. Sound and thermic insulation mattress according to claim 1, wherein the insulating mattress is made of glass wool.

4. Sound and thermic insulation matter according to claim 1, wherein the gluing of the adhesive strip to the foam insert has been effected by heat welding.

\* \* \* \* \*